United States Patent

[11] 3,572,454

| [72] | Inventor | Andrew O. Siren<br>10011 Fairmount Drive, S.E., Calgary,<br>Alberta, Canada |
|---|---|---|
| [21] | Appl. No. | 824,988 |
| [22] | Filed | May 15, 1969 |
| [45] | Patented | Mar. 30, 1971<br>Continuation-in-part of application Ser. No.<br>801,584, Feb. 24, 1968, now abandoned. |

[54] VEHICLE AND STEERING MECHANISM THEREOF
16 Claims, 11 Drawing Figs.

[52] U.S. Cl. ................................................ 180/6.2,
74/230.17
[51] Int. Cl. ..................................................... B62d 11/02
[50] Field of Search............................................ 180/6.2,
6.7; 74/230.17, 722

[56] References Cited
UNITED STATES PATENTS

| 589,989 | 8/1897 | Griffiths | 74/230.17 |
| 710,714 | 10/1902 | Reeves | 74/230.17 |
| 2,529,489 | 11/1950 | Curtis | 180/6.7X |
| 2,938,408 | 5/1960 | Uher | 180/6.2UX |
| 3,269,218 | 8/1966 | Fisher | 180/6.7 |

*Primary Examiner*—Kenneth H. Betts
*Assistant Examiner*—John A. Pekar
*Attorney*—Kent & Ade ABSTRACT: A drive mechanism in which a steering wheel is positively connected to a pair of T-arms by an endless chain. The T-arms open and close variable pulley halves of opposed pair of drive and driven pulley assemblies and gear connections are operated by the T-arms to close or open the other halves of the pulley assemblies, all connections being by positive linkage.

Patented March 30, 1971
3,572,454
3 Sheets-Sheet 1
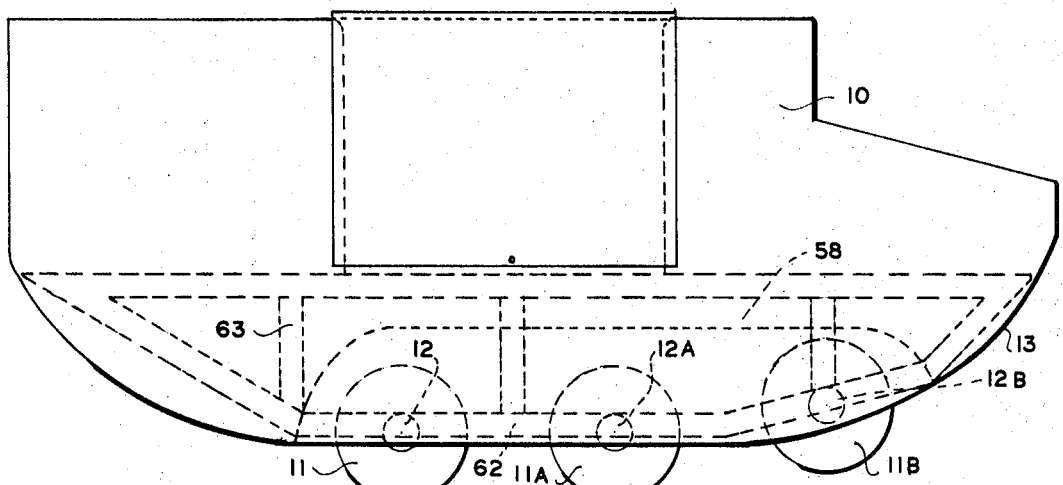
FIG. 1
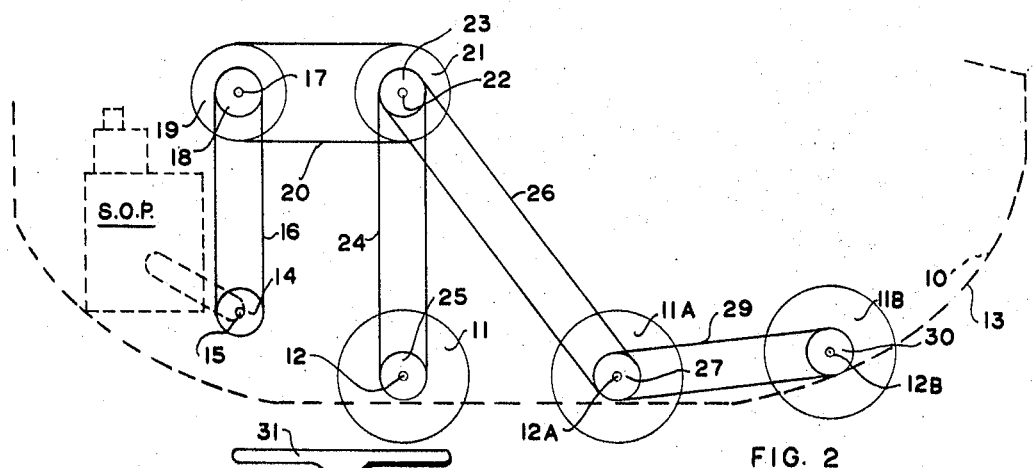
FIG. 2
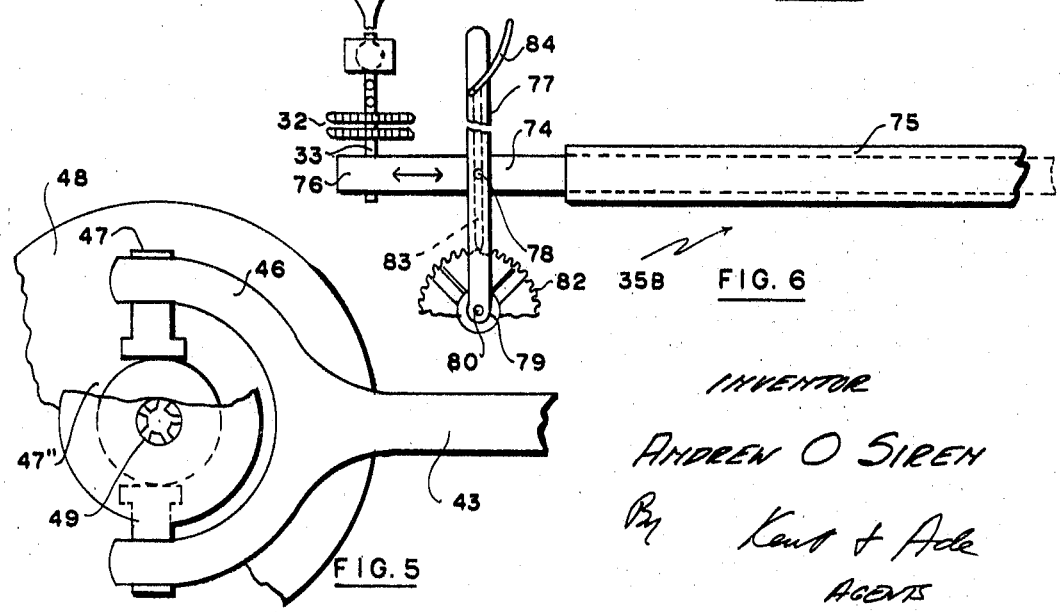
INVENTOR
ANDREW O SIREN
By Kent & Ade
AGENTS

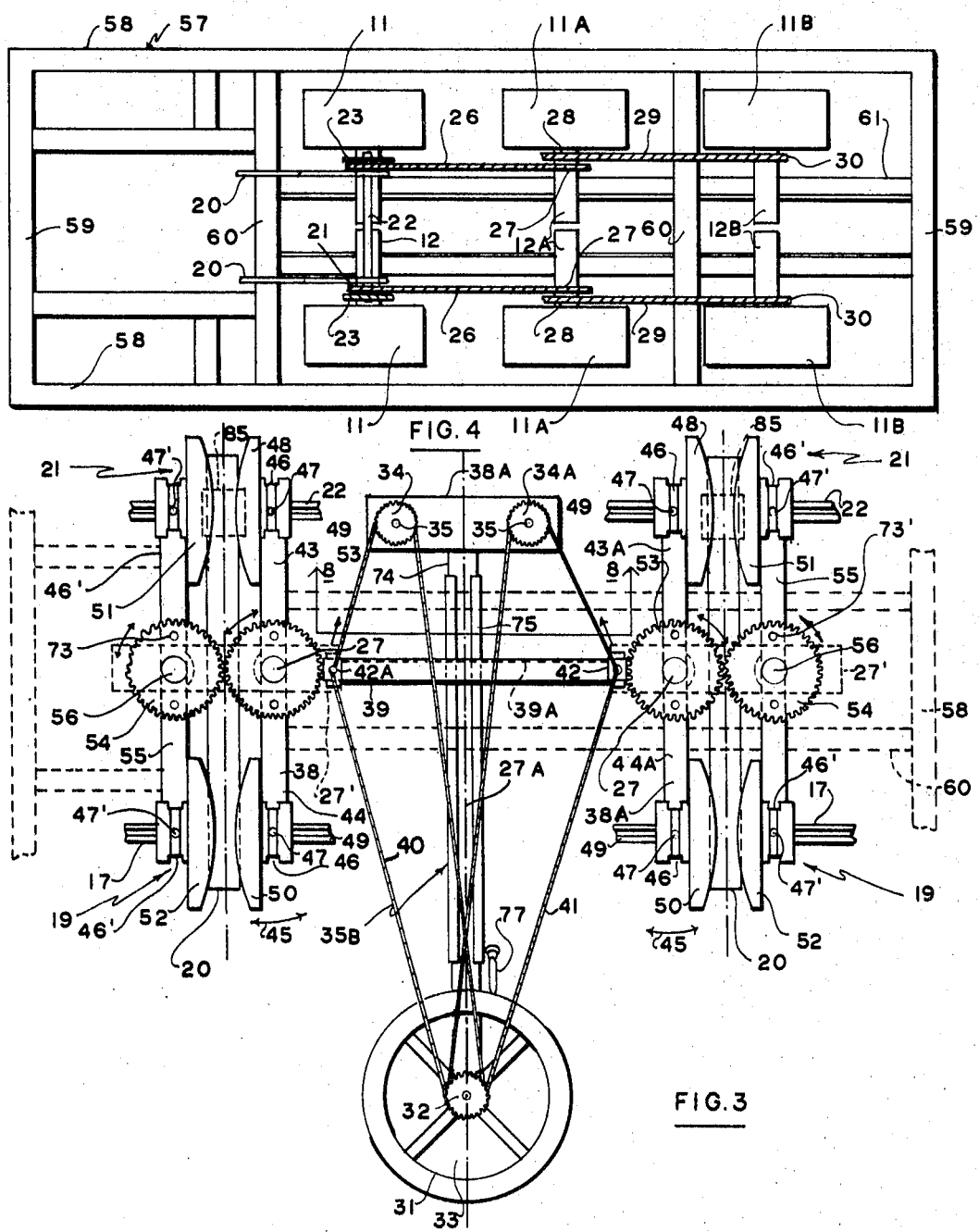

INVENTOR
ANDREW O SIREN

AGENTS

VEHICLE AND STEERING MECHANISM THEREOF

This invention relates to new and useful improvements in vehicles and drive and steering mechanism therefor and constitutes a continuation-in-part of my U.S. application Ser. No. 801,584, filed Feb. 24, 1969, and now abandoned, and is adaptable particularly for use with an amphibious vehicle although the drive and steering mechanism can, of course, be used with any other type of vehicle requiring accurate steering. Furthermore the drive principles can be used in industrial environments.

There are many devices utilizing the split V-pulley principle for power transmission and steering. All of these utilize the end shifting of one flange of the pulley and usually a spring-loaded mechanism for controlling the flange of the other pulley.

Serious disadvantages are encountered with this type of mechanism inasmuch as the pitch control is erratic, is not positive and the belt is either too tight or too loose during the shifting cycle. Linkage control is usually loose and clumsy and there is no centerline for the connecting V-belt because only one side of either the driver or driven variable pitch V-pulley shifts laterally and the heavy belts twist out of true line. Driven variable V-pulley flanges are kept at varying pitches with spring pressure while the pitch of the driver variable V-pulley is usually controlled manually. When the power tension on the belt increases, the pitch of the driven variable V-pulley changes and the speed of rotation is therefore erratic.

The main weakness in other mechanisms of this type is due to the simple fact that both sides of both driven and driver variable V-pulleys do not each shift laterally and equally in relation to each opposed half of the pulley, neither does the pitch of both the driver and driven variable V-pulley respond in exact coordinated opposite action to each other.

The present invention overcomes all of these disadvantages and provides power steering and propulsion of multiple wheel drive amphibian and land vehicles and other machines where most or all of the wheels provide propulsion and the steering of the unit is accomplished by increasing or decreasing the surface speed of any set of opposed wheels manually but automatically. It should be understood that when one side drive wheel increases or decreases speed, the opposite side decreases or increases. This is in contrast with the usual method of steering in which one side or the other is merely braked, thus causing loss of power just when it is needed most.

The mechanism is simple and has very little linkage so that the control is positive and sensitive and the varying speed of the opposed drive wheel is accurately related one to the other depending upon the position of the steering wheel.

With the foregoing in view, and such other or further purposes, advantages or novel features as may become apparent from consideration of this disclosure and specification, the present invention consists of, and is hereby claimed to reside in, the inventive concept which is comprised, embodied, embraced, or included in the method, process, construction, composition, arrangement or combination of parts, or new use of any of the foregoing, of which concept, one or more specific embodiments of same are herein exemplified as illustrative only of such concept, reference being had to the accompanying FIGS. in which:

FIG. 1 is a side elevation of one type of vehicle adapted to use the mechanism.

FIG. 2 is a side schematic view showing the drive connection from the source of power to the half axles.

FIG. 3 is a fragmentary plan view showing the steering and power transmission mechanism.

FIG. 4 is a schematic top plan of FIG. 2.

FIG. 5 is an enlarged fragmentary side elevation showing the connection of one of the T-bars to the pulley half.

FIG. 6 is a fragmentary side elevation of the pitch control mechanism.

FIG. 8 is a fragmentary enlarged cross-sectional view showing the pitch control substantially along the line 8–8 of FIG. 3.

In the drawings like characters of reference indicate corresponding parts in the different FIGS.

Figure 7:
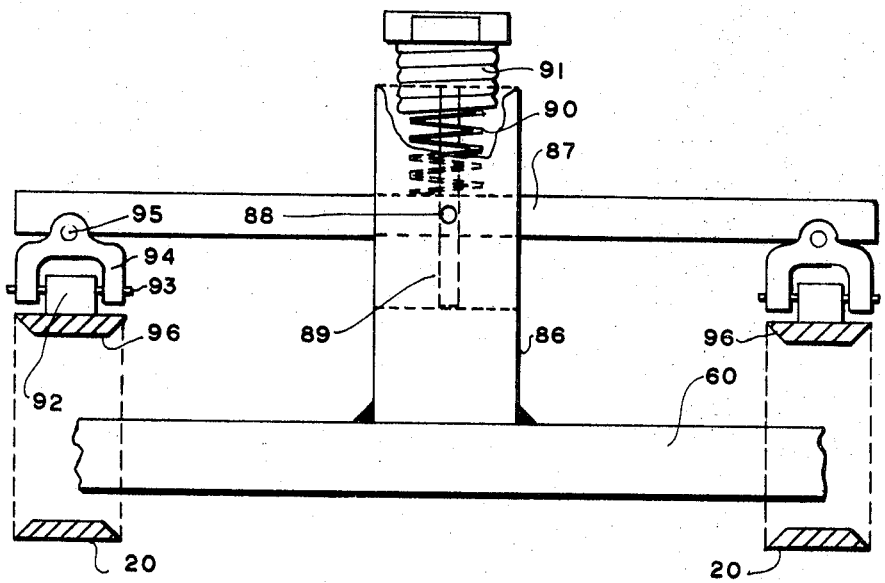
FIG. 7 is a fragmentary enlarged cross-sectional view showing the belt tensioning device.

Proceeding therefore to describe the invention in detail, it will of course be appreciated that steering and power mechanism can be used with many types of vehicles, such as self-propelled swathers and the like, but it is particularly suitable for use with an amphibious vehicle as shown in FIG. 1. This vehicle consists of the body 10 and is provided with three opposed half-axles each of which is provided with a driven wheel thereon. Reference characters 11, 11A and 11B indicate the driven wheels each of which are mounted on corresponding half-axles 12, 12A and 12B. These axles are journaled for rotation within bearings (not illustrated) but which are conventional in construction and it should be observed that one of the most important features of these wheels 11, 11A and 11B is the fact that wheels 11 and 11A are in the same plane, whereas wheels 11B are situated in a plane slightly above the plane of the wheels 11 and 11A and this is shown clearly in FIG. 1. This means that the front wheels act to break a path through snow and to pack same thus preventing the machine from digging in and also when an amphibious vehicle is provided with a hull profile 13 as shown in phantom in FIG. 2 and shown in side elevation in FIG. 1, the elevation of these wheels assist in the planning characteristics of the device when used in water.

Reference to FIG. 2 will show that a source of power (not illustrated) drives a main pulley 14 mounted upon shaft 15 which transmits the power via belt 16 to a main driver shaft 17 through pulley 18 secured thereto.

Mounted on this main driver shaft 17 is a pair of driver variable pulleys 19 having heavy duty V-belts 20 extending therearound and around corresponding driven variable V-pulley assemblies 21 mounted upon a driven shaft 22. Also on shaft 22 are sprockets 23, sprockets 23 being dual. Chain 24 extends around one of the dual sprockets 23 and around a sprocket 25 secured to half shafts 12. A further chain 26 extends around the other portion of dual sprockets 23 and around sprockets 27 secured to half shafts 12A.

Also on 12A are further sprockets 28 around which drive chains 29 extend, said chains also engaging around sprockets 30 secured to half shafts 12B so that drive is transmitted to each of the wheels 11, 11A and 11B from one set of driven variable pulleys 21 and to the other wheels 11, 11A and 11B from the other set of driven variable pulleys 21.

Referring next to FIG. 3, reference character 31 illustrates a conventional relatively large diameter steering wheel having a relatively small diameter sprocket 32 mounted concentrically therewith upon the steering wheel shaft 33.

This sprocket 32 is dual, the reasons for which will hereinafter be described.

Forwardly of the steering wheel is a pair of sprockets 34 and 34A mounted upon shafts 35 supported upon a plate 35A forming part of a pitch control assembly 35B hereinafter to be described.

Vertical pivot shafts 27 are mounted within gear frames 27' in spaced and parallel relationship one upon each side of the longitudinal center line 27A shown in FIG. 3. Mounted upon these shafts and secured thereto as by welding are T-cranks 38 and 38A.

The central arms 39, 39A extend towards and overlap the longitudinal center line 27 and in fact overlie one another for compactness of assembly. An endless chain 40 extends around one of the sprockets 32 and around sprocket 34. The ends of this chain forming the endless chain are secured to one end 42A of the arm 39A.

Figure 11:
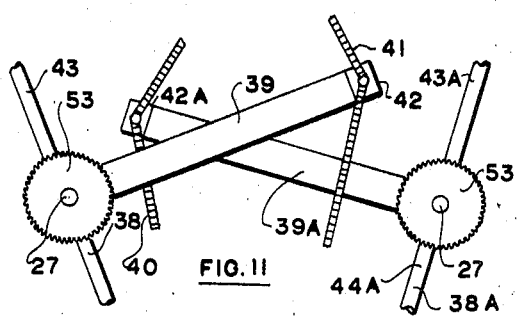
FIG. 11 is an enlarged fragmentary plan view of the T-cranks, the position thereof being exaggerated for clarity.

A further chain 41 extends around the other sprocket 32 and around sprocket 34A, the ends being secured to end 42 of arm 39 thus making this chain endless. Rotation of the steering wheel will cause arms 39 and 39A to move in an arc in the opposite direction around pivot shafts or spindles 27. This gives an extremely positive movement to the ends of the arms 39 and 39A when the steering wheel is rotated and eliminates any slack which might be present in the chains irrespective of the direction of turn of the steering wheel. FIG. 11 clarifies this portion of the mechanism.

This rotation of the steering wheel 31 pivots the cranks around the mounting pivot shafts 37 so that the crossarms 43, 43A and 44, 44A will move substantially in a direction at right angles to the longitudinal centerline 27A, in other words, in the direction of double-headed arrows 45.

Arms 43 and 43A of these T-cranks are provided with yokes 46 on the ends thereof and these yokes carry pivot blocks 47 in the ends thereof which engage annular channels 47' formed on the outer sides of the halves 48 of the variable pulleys 21. These pulley halves are splined to shafts 22 and are movable therealong although rotatable by the shafts and reference character 49 illustrates this splining on the shafts. Details of this connection are shown in FIG. 5.

Arms 44 and 44A are similarly connected to pulley half 50 of the variable pulley assembly 19 so that similar reference characters have been given the connecting portions.

From the foregoing it will be seen that rotation of the steering wheel in either direction will rock the T-cranks around shafts 37 thus moving both pulley halves 48 and 50 in opposite directions along the shafts 22 and 17 respectively. However, it will also be noted that if the T-cranks arms 43 operate to move pulley halves 48 towards corresponding pulley halves 51 then crank arms 44 will move pulley halves 50 away from pulley halves 52, all pulley half movements being exactly equal and opposite to one another due to the lack of loose or sloppy linkage in the assembly.

An important part of the invention is the fact that when the pulley halves are mounted by the T-cranks as hereinbefore described, the corresponding pulley halves are also moved laterally in opposition and in this connection reference should be made to FIG. 3 which shows the connection between the T-cranks and the mechanism for actuating the corresponding pulley halves.

Secured to the T-cranks 39 and 39A are gears or gear quadrants 53, said gears or gear quadrants being also secured to the pivot shafts 27.

These gear or gear quadrants 53 engage further gear or gear quadrants 54 secured to lever arms 55 pivotally mounted upon pivot shafts 56 which are in alignment with pivot shafts 37 and are carried within frames 27'.

The ends of the levers 55 are connected to the pulley halves 51 and 52 respectively in a manner similar to the connection of the T-crank arms 43 and 44 to the pulley halves 48 and 50 respectively so that similar reference characters have been used, but with prime numbers for clarity.

It will be therefore observed that if pulley halves 48 are moved towards pulley halves 51, then the connection through gears 53, 54 and lever arms 55 will move pulley halves 51 towards pulley halves 48 in exactly the same relationship and exactly the same distance.

Conversely, pulley halves 50 will be moved away from pulley halves 52 and pulley halves 52 will be moved away equally and oppositely to pulley halves 50 so that the belts 20 running therebetween remain on exactly the same running plane and the tension in these belts is always constant. This must assume, of course, that the pivot spindles 37, 37A are exactly midway between the axles of shafts 17 and 22 and that the arms 38 and 44 of the T-cranks are also equal.

This double action together with the positive securement of the T-cranks to the operating chains 40 and 41 ensures that the slightest movement of the steering wheel finds corresponding movement in the pulley assemblies without any slack or sloppiness being evident.

This permits extremely accurate steering and at the same time also is an efficient drive transfer mechanism inasmuch as the belts are always running in the same plane and have the same tension. Furthermore, any increase in torque does not result in either of the pulley assemblies widening or narrowing due to the positive holding mechanism of the individual pulley halves.

This also ensures that identical ground speed is provided on both sides of the vehicle when the steering wheel is centered, and that the vehicle can be steered positively because synchronized ground speed is automatic since the operator can slow down or increase the speed of either side of the vehicle readily and easily.

Figure 9:
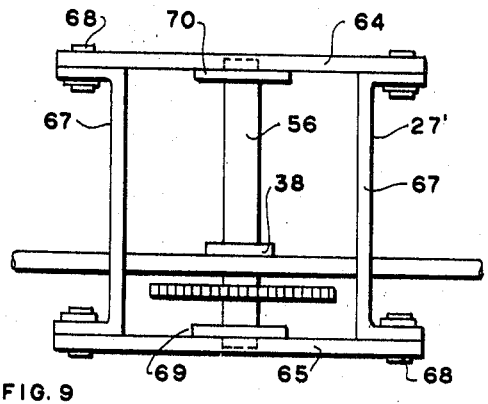
FIG. 9 is an enlarged end elevation of the support bracket for the T-bar sprockets.
Figure 10:
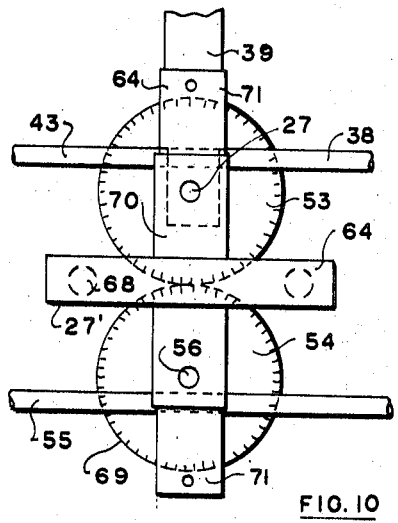
FIG. 10 is a top plan view of FIG. 9.

Referring back to the gear frames 27', reference should be made to FIGS. 9 and 10.

They are supported within the general framework collectively designated 57 and shown in plan view in FIG. 4 and in phantom in FIG. 1. The framework consists of square cross-sectioned longitudinal members 58 and transverse members 59 with intermediate transverse members 60 as clearly shown. Subsidiary longitudinal members 61 extend parallel to the longitudinals 58 and inboard thereof and lower frame members (FIG. 1) 62 extend from end to end below the longitudinals 58 and are supported by verticals 63.

The gear frames 27' consist of a substantially rectangular frame comprising upper and lower straps 64 and 65 respectively, held in spaced-apart relationship by spaced and parallel vertical straps 67 bolted to the upper and lower straps 64 and 65 by means of nut-and-bolt assemblies 68.

A transverse lower strap member 69 is secured as by welding to the lower strap 65 and is situated at right angles thereto and a corresponding upper transverse strap 70 is secured as by welding intermediate the ends of the upper strap 64.

The ends 71 of the lower transverse strap 69 extends beyond the gear frames and is secured to members of the general framework by welding or by bolts extending through apertures 72 within these ends 71.

The vertical pivot shafts 27 and 56 are journaled for rotation within upper and lower transverse straps 69 and 70, one upon each side of the upper and lower straps 64 and 65 and the aforementioned gears 53 and 54 are secured to these shafts as hereinbefore described, and in meshing engagement one with the other as clearly shown in FIG. 10.

In FIG. 10, the portions 38 and 55 of the levers are shown welded to the vertical shafts 27 and 56 respectively, but in FIG. 3, an alternative construction is shown whereby these portions are apertured and fit over the shafts 27 and 56 and are bolted to the underside of the gears by means of bolts 73.

Means are provided to act as a clutch and pitch control mechanism and reference to FIGS. 3 and 8 show details of this.

The aforementioned plate 35A upon which the sprockets 34 and 34A are mounted, is secured to a longitudinally extending slide member 74 which is of square cross section and which is mounted for longitudinal movement between opposite pairs of longitudinally extending channels 75 supported within the framework of the machine and substantially on the longitudinal axis 27A.

Reference to FIG. 6 shows how this shaft 74 is actuated. It will be observed that the aforementioned steering wheel 31 and column 33 are secured to the front end 76 of the sliding shaft 74 and I have provided a lever 77 adjacent the steering column and pivoted intermediate the ends thereof to the sliding shaft 74 by means of pins 78. The lower end 79 of the lever is pivoted upon fixed pivot 80 below the shaft 74 so that movement of the lever upper end in the direction of double-headed arrow 81, will move the shaft 74 forwardly and rearwardly within the guide channels 75.

A ratchet quadrant 82 is associated with the lever and a ratchet 83, controlled by ratchet lever 84 is secured to the lever 77 and actuates in the well-known manner to maintain the sliding shaft 74 in the desired position until it is required to move same.

From foregoing, and because the sprockets 32 together with the chains 40, 41 move with the sliding shaft 74 so that if the ratchet lever 84 is released, movement of the levers 77 will move the entire assembly forwardly or rearwardly along the longitudinal axis 27A of the machine. This has the effect of moving the arms 39 and 39A of the T-cranks because the chains 40 and 41 are anchored to the ends of these arms. If the lever 77 is pushed forwardly towards the steering wheel 31, the arms 39 and 39A of the T-cranks are also moved forwardly thus spreading apart the pulley halves of the assemblies 21 to the fullest extend and closing the pulley halves of the assemblies 19 to the fullest extent. I provide freewheeling belly rollers or idling rollers 85 between the pulley halves of the assemblies 21 which run freely on the shafts 22 and which engage within recess (not illustrated) on the interior of the pulley halves so that these pulley halves can open and close over the idling rollers. This arrangement is well known so that further details have not been shown.

When the pulley halves of the assemblies are in their widest position as hereinbefore described, the belts 20 drop onto these rollers and are rotated by the main drive mechanism but without any drive being transferred to the pulley assemblies 21. In other words, the machine is idling in neutral and no drive is connected to the drive wheels.

However if the lever 77 is then pulled rearwardly, the reverse situation takes place and the pulley halves of the assemblies 21 commence to close. At the same time the pulley halves of the assemblies 19 start to open as hereinbefore described. This takes up the drive and the further back the lever 77 is pulled, the greater the speed of the drive wheels due to the fact that the belts 20 climb up to the maximum on the pulley halves of the assemblies 21 and to the minimum on the pulley halves of the assemblies 19. This gives an infinite pitch control between neutral or idling up to full speed with a constant engine speed. At any time the forward speed may be maintained by releasing the ratchet lever 84 and locking the slide bar 74 in position upon the ratchet quadrant 82. Under these conditions, of course, the steering assembly can actuate as hereinbefore described in any position of the slide bar 74 with the exception of the neutral position.

The relatively wide heavy drive belts 20, although not requiring belt tighteners as such, nevertheless do require means to steady same and to prevent flap from occurring and FIG. 7 shows one arrangement to accomplish this.

Supported upon one of the crossmembers 60 of the framework and centrally thereof is an upstanding post 86 within which is pivoted a crossbeam 87 upon pivot pins 88. The pivot pin 88 runs within vertical slots 89 to enable limited up and down movement of the beam 87.

A coil spring 90 reacts between an adjustment nut 91 screwed into the upper end of the post 86, and the beam 87 normally biassing the beam downwardly.

On the ends of the beam are belt engaging rollers 92 journaled upon pins 93 carried within bifurcated brackets 94 which in turn are pivotally connected by pins 95 to the ends of the beam 87, said pins 95 being at right angles to pins 93.

These rollers are urged into contact with the upper runs 96 of belts 20 by means of the aforementioned coil spring 90 and eliminate flap and do act as belt tensioners rather than belt tighteners, it being understood that the beam can pivot around pin 88 and always maintain the same pressure upon the said upper runs of the belts 20.

It will of course be appreciated that although the clutch and pitch control mechanism 35B together with the steering mechanism are particularly suited for use with amphibious machines or farm machines, the same principles can be utilized in industry wherever compensatory movement is required between two drives without any slack being evident.

It will also be appreciated that cables or other forms of drive means can be used rather than chains and sprockets but it is believed that chains and sprockets give the best positive action at the minimum of cost.

Although in the present drawings, the driven and drive variable pulley assemblies have been shown having the same diameter, nevertheless it will be appreciated that they can be of different sizes providing both diver assemblies have the same diameter and both driven assemblies have the same diameter.

Various modifications can be made within the scope of the inventive concept which is herein disclosed and/or claimed.

I claim:

1. A drive mechanism for vehicles and the like having a source of power, comprising in combination with supporting structure, a pair of drive pulley assemblies and a pair of driven pulley assemblies, belts extending around corresponding drive and drive pulley assemblies, each of said pulley assemblies including a shaft and a pair of pulley halves splined to said shafts for rotation thereby and endwise movement therealong, an actuating T-crank connecting between one of the halves of each of the said corresponding drive and driven pulley assemblies, said T-crank having a central arm and a crossarm extending transversely upon either side of one end of said central arm, a lever arm connected between the other of the halves of each of the said corresponding drive and driven pulley assemblies, means intermediate the ends of the crossarm of said T-crank and said lever mounting same for pivotal action, means interconnecting said T-crank and said lever whereby pivotal action of said T-crank causes opposite and equal pivoted action of said lever, a steering wheel assembly mounted in said supporting structure and positive linkage means operatively connecting said steering wheel to the other end of the central arm of said T-cranks.

2. The device according to claim 1 in which said means interconnecting said T-cranks and said lever arm comprises meshing gear quadrants mounted coincidental with said pivotal mounting points on each of said T-cranks and said lever arms.

3. The device according to claim 2 in which each end of said T-crank connection to said pulley halves includes a yoke, pins extending from the ends of said yoke, and an annular pin groove on said pulley halves engageable by said pins.

4. The device according to claim 3 in which said positive linkage includes a pair of gear sprockets mounted at the rear of said machine, a double sprocket mounted on said steering wheel assembly, and a chain extending around one of said double sprockets and one of said pairs of sprockets, the ends of said chain being secured to the end of said T-cranks, and a further chain extending around the other of said double sprockets and the other of said pair of sprockets, the ends of said further chain being secured to the end of the other said T-cranks, whereby rotation of the steering wheel assembly in one direction causes said ends of said T-cranks to move in one direction and rotation of said steering wheel assembly in the other direction, causes the ends of said T-cranks to move in the other direction, the ends of said T-cranks always moving in opposite directions to one another.

5. The device according to claim 3 which includes a clutch and pitch control assembly operatively connected between said steering wheel assembly and said T-cranks, said clutch and pitch control assembly being operatively connected between said steering wheel assembly of said T-crank for engaging said belts with said drive and driven pulleys and controlling the spacing between corresponding pulley halves on the drive shafts and corresponding pulley halves on said driven shafts, means to adjust said clutch and pitch control assembly between a neutral, no-drive position, to a full speed position, and means to detachably lock said assembly anywhere between said positions.

6. The device according to claim 2 in which said positive linkage includes a pair of gear sprockets mounted at the rear of said machine, a double sprocket mounted on said steering wheel assembly, and a chain extending around one of said double sprockets and one of said pairs of sprockets, the ends of said chain being secured to the end of said T-cranks, and a further chain extending around the other of said double sprockets and the other of said pair of sprockets, the ends of said further chain being secured to the end of the other said T-cranks, whereby rotation of the steering wheel assembly in one direction causes said ends of said T-cranks to move in open direction and rotation of said steering wheel assembly in the other direction, causes the ends of said T-cranks to move in the other direction, the ends of said T-cranks always moving opposite directions to one another.

7. The device according to claim 6 which includes a clutch and pitch control assembly operatively connected between said steering wheel assembly and said T-cranks, said clutch and pitch control assembly being operatively connected between said steering wheel assembly of said T-crank for engaging said belts with said drive and driven pulleys and controlling the spacing between corresponding pulley halves on the drive shafts and corresponding pulley halves on said driven shafts, means to adjust said clutch and pitch control assembly between a neutral, no-drive position, to a full speed position, and means to detachably lock said assembly anywhere between said positions.

8. The device according to claim 7 in which said clutch and pitch control assembly includes a mounting plate, said pair of sprockets being supported upon said plate, a sliding shaft, means mounting said shaft for longitudinal sliding movement in said framework, said steering wheel assembly being mounted on the front end of said sliding shaft, said mounting plate being secured to the rear end of said sliding shaft.

9. The device according to claim 2 which includes a clutch and pitch control assembly operatively connected between said steering wheel assembly and said T-cranks, said clutch and pitch control assembly being operatively connected between said steering wheel assembly of said T-crank for engaging said belts with said drive and driven pulleys and controlling the spacing between corresponding pulley halves on the drive shafts and corresponding pulley halves on said driven shafts, means to adjust said clutch and pitch control assembly between a neutral, no-drive position, to a full speed position, and means to detachably lock said assembly anywhere between said positions.

10. The device according to claim 1 in which each end of said T-crank connection to said pulley halves includes a yoke, pins extending from the ends of said yoke, and an annular pin groove on said pulley halves engageable by said pins.

11. The device according to claim 10 in which said positive linkage includes a pair of gear sprockets mounted at the rear of said machine, a double sprocket mounted on said steering wheel assembly, and a chain extending around one of said double sprockets and one of said pairs of sprockets, the ends of said chain being secured to the end of said T-cranks, and a further chain extending around the other of said double sprockets and the other of said pair of sprockets, the ends of said further chain being secured to the end of the other said T-cranks, whereby rotation of the steering wheel assembly in one direction causes said ends of said T-cranks to move in one direction and rotation of said steering wheel assembly in the other direction, causes the ends of said T-cranks to move in the other direction, the ends of said T-cranks always moving in opposite direction to one another.

12. The device according to claim 10 which includes a clutch and pitch control assembly operatively connected between said steering wheel assembly and said T-cranks, said clutch and pitch control assembly being operatively connected between said steering wheel assembly of said T-crank for engaging said belts with said drive and driven pulleys and controlling the spacing between corresponding pulley halves on the drive shafts and corresponding pulley halves on said driven shafts, means to adjust said clutch and pitch control assembly between a neutral, no-drive position, to a full speed position, and means to detachably lock said assembly anywhere between said positions.

13. The device according to claim 1 in which said positive linkage includes a pair of gear sprockets mounted at the rear of said machine, a double sprocket mounted on said steering wheel assembly, and a chain extending around one of said double sprockets and one of said pairs of sprockets, the ends of said chain being secured to the end of said T-cranks, and a further chain extending around the other of said double sprockets and the other of said pair of sprockets, the ends of said further chain being secured to the end of the other said T-cranks, whereby rotation of the steering wheel assembly in one direction causes said ends of said T-cranks to move in one direction and rotation of said steering wheel assembly in the other direction, causes the ends of said T-cranks to move in the other direction, the ends of said T-cranks always moving in the opposite directions to one another.

14. The device according to claim 13 which includes a clutch and pitch control assembly operatively connected between said steering wheel assembly and said T-cranks, said clutch and pitch control assembly being operatively connected between said steering wheel assembly of said T-crank for engaging said belts with said drive and driven pulleys and controlling the spacing between corresponding pulley halves on the drive shafts and corresponding pulley halves on said driven shafts, means to adjust said clutch and pitch control assembly between a neutral, no-drive position, to a full speed position, and means to detachably lock said assembly anywhere between said positions.

15. The device according to claim 14 in which said clutch and pitch control assembly includes a mounting plate, said pair of sprockets being supported upon said plate, a sliding shaft, means mounting said shaft for longitudinal sliding movement in said framework, said steering wheel assembly being mounted on the front end of said sliding shaft, said mounting plate being secured to the rear end of said sliding shaft.

16. The device according to claim 1 which includes a clutch and pitch control assembly operatively connected between said steering wheel assembly and said T-cranks, said clutch and pitch control assembly being operatively connected between said steering wheel assembly of said T-crank for engaging said belts with said drive and driven pulleys and controlling the spacing between corresponding pulley halves on the drive shafts and corresponding pulley halves on said driven shafts, means to adjust said clutch and pitch control assembly between a neutral, no-drive position, to a full speed position, and means to detachably lock said assembly anywhere between said positions.